(12) United States Patent
Tseng et al.

(10) Patent No.: US 8,724,057 B2
(45) Date of Patent: May 13, 2014

(54) COLOR FILTER ARRAY ON PIXEL ARRAY SUBSTRATE AND DISPLAY PANEL

(75) Inventors: Chin-An Tseng, Taipei (TW); Hung-Lung Hou, Changhua County (TW); Chia-Yu Lee, Taipei County (TW); Yen-Heng Huang, Taipei County (TW); Chung-Kai Chen, Taichung County (TW); Chieh-Wei Chen, Taichung County (TW); Yi-Tsun Lin, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 1172 days.

(21) Appl. No.: 12/578,565

(22) Filed: Oct. 13, 2009

(65) Prior Publication Data

US 2011/0001909 A1 Jan. 6, 2011

(30) Foreign Application Priority Data

Jul. 6, 2009 (TW) .............................. 98122772 A (51) Int. Cl.
*G02F 1/1335* (2006.01)
*G02F 1/1333* (2006.01)

(52) U.S. Cl.
USPC .......................................... 349/106; 349/110

(58) Field of Classification Search
USPC .................................... 349/43, 106, 110, 156
See application file for complete search history.

(56) References Cited

U.S. PATENT DOCUMENTS 6,445,432 B2 9/2002 Yamamoto et al.
6,693,697 B2 * 2/2004 Sakamoto et al. ............ 349/138
7,042,538 B2 5/2006 Chen
7,227,185 B2 6/2007 Lin
7,306,883 B2 12/2007 Ito
2001/0012079 A1 * 8/2001 Yamamoto et al. ........... 349/106
2002/0089615 A1 7/2002 Sakamoto et al.
2004/0252271 A1 * 12/2004 Song .............................. 349/155

(Continued)

FOREIGN PATENT DOCUMENTS

CN 1503012 6/2004
CN 1609637 4/2005

(Continued)

OTHER PUBLICATIONS

"1st Office Action of China counterpart application", issued on May 12, 2010, p. 1-p. 6.

(Continued)

*Primary Examiner* — Edward Glick
*Assistant Examiner* — David Chung
(74) *Attorney, Agent, or Firm* — Jianq Chyun IP Office (57) ABSTRACT

A color filter array on pixel array substrate including a substrate, an active device array, a color filter array and a pixel electrode layer is provided. The substrate has a plurality of pixel regions and a light-shielding region. The active device array is disposed on the substrate. The color filter array is disposed on the substrate, and includes a light shielding patterned layer and a plurality of color filter patterns, wherein the light-shielding patterned layer is disposed in the light-shielding region. The color filter patterns are respectively disposed in the pixel regions and extend from the pixel regions into the light shielding regions, wherein the color filter patterns extending from adjacent pixel regions constitute a stacked structure within the light shielding regions. The pixel electrode layer is electrically connected to the active device array.

7 Claims, 7 Drawing Sheets

(56) References Cited

U.S. PATENT DOCUMENTS

2007/0287079 A1* 12/2007 Li et al. .............................. 430/7
2008/0068537 A1* 3/2008 Lee et al. ....................... 349/106
2008/0151155 A1 6/2008 Takizawa et al.
2009/0173947 A1* 7/2009 Kim ................................ 257/72

FOREIGN PATENT DOCUMENTS

| CN | 1928714 | 3/2007 |
|---|---|---|
| CN | 101101401 | 1/2008 |
| TW | 472226 | 1/2002 |
| TW | 584776 | 4/2004 |
| TW | I238909 | 9/2005 |

OTHER PUBLICATIONS

"Second Office Action of China Counterpart Application", issued on Jul. 6, 2011 p. 1-p. 6.

"Office Action of Taiwan Counterpart Application", issued on Nov. 29, 2012, p. 1-p. 7.

* cited by examiner

COLOR FILTER ARRAY ON PIXEL ARRAY SUBSTRATE AND DISPLAY PANEL

CROSS-REFERENCE TO RELATED APPLICATION

This application claims the priority benefit of Taiwan application serial no. 98122772, filed Jul. 6, 2009. The entirety of the above-mentioned patent application is hereby incorporated by reference herein and made a part of specification.

BACKGROUND OF THE INVENTION

1. Field of the Invention

The present invention relates to a substrate and a display panel. More particularly, the present invention relates to a color filter array on pixel array substrate, and a display panel.

2. Description of Related Art

Since a liquid crystal display (LCD) has advantages of high display quality, small size, light weight, low driving voltage, low power consumption and wide application range, etc., it has replaced a cathode ray tube (CRT) and become a main stream in the display market. A conventional LCD panel is composed of a color filter substrate, a thin film transistor (TFT) array substrate and a liquid crystal layer disposed between the above two substrates. However, such LCD panel may have a misalignment problem when the color filter substrate and the TFT array substrate are assembled.

To mitigate the above problem, the conventional technique provides a LCD panel composed of a color filter on array (COA) substrate, an opposite substrate, a plurality of spacers and a liquid crystal layer. The spacers and the liquid crystal layer are disposed between the COA substrate and the opposite substrate, and the spacers are used for maintaining a space between the COA substrate and the opposite substrate. In the LCD panel, since the color filter layer is directly formed on the TFT array substrate, the misalignment problem occurred during the assembling can be avoided.

It should be noticed that during a fabrication process of the LCD panel, considering an alignment accuracy, a black matrix material layer with a slight light transmittance is used, so that before the black matrix material layer is patterned, an alignment mark on a bottom film layer thereof can still be captured by a fabrication machine through the black matrix material layer with the slight light transmittance, so as to ensure the alignment accuracy of different film layers. However, when the black matrix material layer with a slight light transmittance is used for the above benefit, after the black matrix is patterned, it probably cannot achieve a total light-shielding effect, which may lead to a decrease of a contrast of the LCD panel, and a display quality thereof is influenced.

SUMMARY OF THE INVENTION

The present invention is directed to a color filter array on pixel array substrate, which can improve an alignment accuracy during a fabrication process thereof, so as to improve a production yield and reduce a fabrication cost.

The present invention is directed to a display panel, which may have an excellent alignment accuracy during a fabrication process thereof, so as to obtain a high contrast product.

The present invention provides a color filter array on pixel array substrate including a substrate, an active device array, a color filter array and a pixel electrode layer. The substrate has a plurality of pixel regions and a light-shielding region. The active device array is disposed on the substrate. The color filter array is disposed on the substrate, and includes a light-shielding patterned layer and a plurality of color filter patterns. The light-shielding patterned layer is disposed in the light-shielding region. The color filter patterns are respectively disposed in the pixel regions and extend from the pixel regions to the light-shielding region, wherein the color filter patterns extending from adjacent pixel regions constitute a stacked structure within the light-shielding region. The pixel electrode layer is electrically connected to the active device array.

The present invention provides a display panel including a color filter array on pixel array substrate, an opposite substrate and a display medium. The color filter array on pixel array substrate includes a substrate, an active device array, a color filter array and a pixel electrode layer. The substrate has a plurality of pixel regions and a light-shielding region. The active device array is disposed on the substrate. The color filter array is disposed on the substrate, and includes a light-shielding patterned layer and a plurality of color filter patterns. The light-shielding patterned layer is disposed in the light-shielding region. The color filter patterns are respectively disposed in the pixel regions and extend from the pixel regions to the light-shielding region, wherein the color filter patterns extending from adjacent pixel regions constitute a stacked structure within the light-shielding region. The pixel electrode layer is electrically connected to the active device array. The opposite substrate is disposed at an opposite side of the color filter array on pixel array substrate. The display medium is disposed between the color filter array on pixel array substrate and the opposite substrate.

According to the above description, a material with a relatively low optical density can be used for fabricating the light-shielding patterned layer, so as to improve the alignment accuracy of the film layers. On the other hand, at a corresponding position of the light-shielding patterned layer in the light-shielding region, the color filter patterns extending from adjacent pixel regions constitute a stacked structure within the light-shielding region, which can assist a light-shielding effect of the light-shielding patterned layer in the light-shielding region, so as to improve a contrast of the product.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
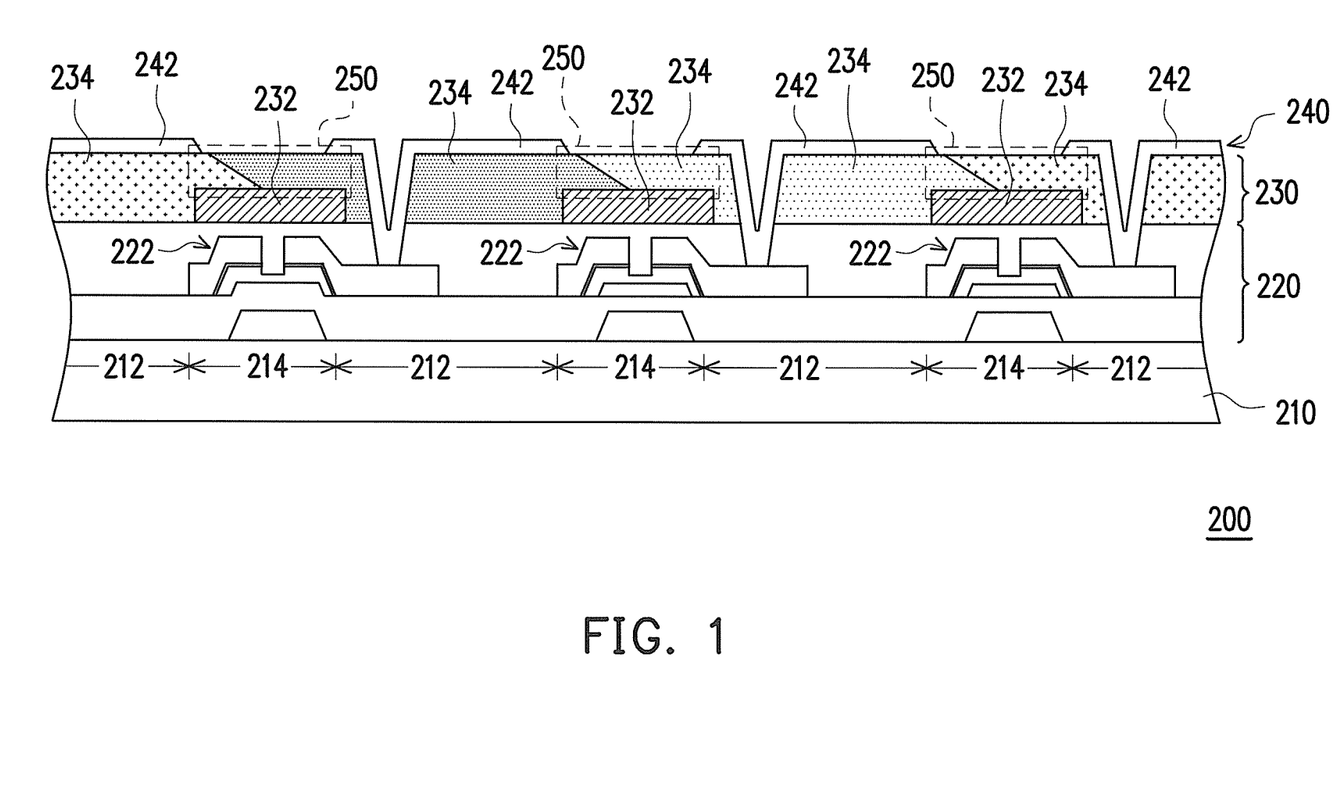
FIG. 1 is a partial cross-sectional view of a color filter array on pixel array substrate according to an embodiment of the present invention.

FIG. 1 is a partial cross-sectional view of a color filter array on pixel array substrate according to an embodiment of the present invention. Referring to FIG. 1, the color filter array on pixel array substrate 200 of the present invention includes a substrate 210, an active device array 220, a color filter array 230 and a pixel electrode layer 240. In detail, the substrate 210 has a plurality of pixel regions 212 and a light-shielding region 214. Particularly, the light-shielding region 214 surrounds each of the pixel regions 212. The active device array 220 is disposed on the substrate 210. The color filter array 230 is disposed on the substrate 210, and includes a light-shielding patterned layer 232 located at the light-shielding region 214 and a plurality of color filter patterns 234. The color filter patterns 234 are respectively disposed in the pixel regions 212 and extend from the pixel regions 212 to the light-shielding region 214, wherein the color filter patterns 234 extending from adjacent pixel regions 212 constitute a stacked structure 250 within the light-shielding region 214. The pixel electrode layer 240 and the active device array 220 are electrically connected to the pixel regions 212 on the substrate 210. In detail, the active device array 220 has a plurality of active devices 222 arranged in an array, and each of the active devices 222 is correspondingly disposed in the light-shielding region 214. The pixel electrode layer 240 has a plurality of pixel electrodes 242, wherein each of the pixel electrodes 242 is correspondingly disposed in each of the pixel regions 212, and is electrically connected to the corresponding active device 222.

Further, in the present embodiment, the light-shielding patterned layer 232 is, for example, located between the active device array 220 and the color filter patterns 234. Moreover, a fabrication process of the color filter array on pixel array substrate 200 includes following steps. First, the active device array 220 is formed on the substrate 210, and an alignment mark is fabricated at a specific position on a specific film layer of the active device array 220. Next, a light-shielding material layer is fully formed on the active device array 220, and the light-shielding patterned layer 232 (for example, a black matrix) is fabricated through a patterning process. It should be noticed that during the patterning process of the light-shielding patterned layer 232, an exposure machine first captures the alignment mark located on a bottom layer of the light-shielding material layer, and then performs an exposure process. Then, a development process is performed to pattern the light-shielding material layer to form the black matrix. In the present embodiment, the light-shielding layer can be formed by a material with a relatively low optical density, so as to increase the recognition of the alignment mark.

In detail, an optical density of the light-shielding patterned layer 232 is, for example, between 0.6-3.4. Therefore, when the exposure machine captures the alignment mark located at the bottom layer of the light-shielding material layer, a clear alignment mark can be easily and effectively recognized, so as to avoid the problems such as decrease of an aperture ratio, etc. cause by alignment shift between upper and lower film layers. Therefore, during the fabrication process of the color filter array on pixel array substrate 200, the alignment accuracy can be improved, and a fabrication time can be reduced. Moreover, the material with a relatively low optical density can be selected for the light-shielding material layer, which avails reducing a material cost.

On the other hand, the light-shielding region 214 of the color filter array on pixel array substrate 200 has the stacked structure 250 formed by the color filter patterns 234, and since the stacked structure 250 may also have a light-shielding effect, the light-shielding effect of the light-shielding patterned layer 232 in the light-shielding region 214 is strengthened, so as to totally block the light from passing through the light-shielding region 214. In detail, an optical density of the stacked structure 250 is, for example, between 0.6-1.2. In the present embodiment, an optical density of an overlapped region of the light-shielding patterned layer 232 and the stacked structure 250 is, for example, between 1.8-4.0, and the higher the optical density is, the better the light-shielding effect is. Therefore, after the color filter array on pixel array substrate 200 is fabricated, the light-shielding region 214 can still maintain a certain light-shielding effect, which avails improving the contrast of the product.

Figure 2A:
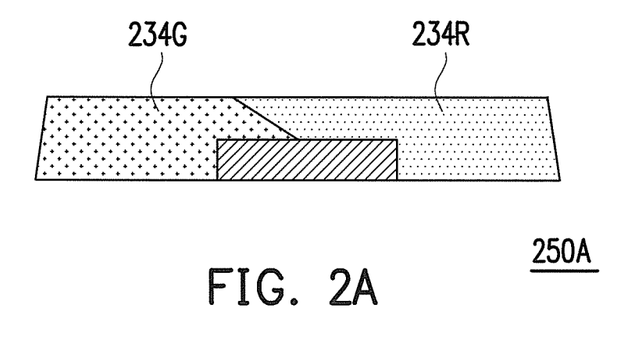
FIGS. 2A-2C are cross-sectional views of different patterns of a stacked structure according to an embodiment of the present invention.
Figure 2B:
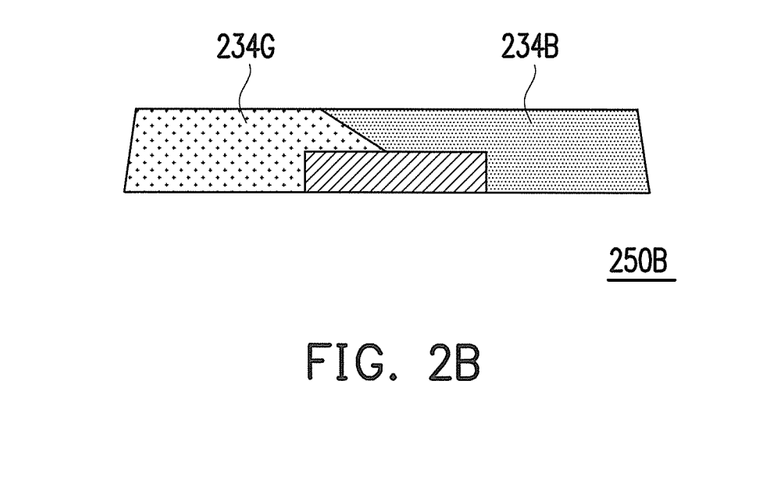
Figure 2C:
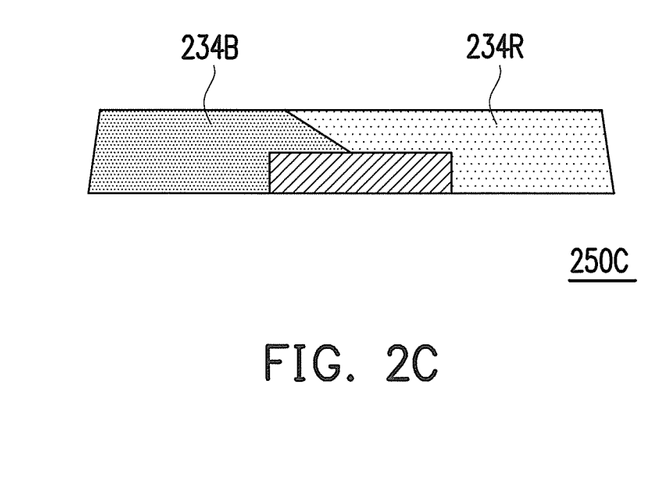

FIGS. 2A-2C are cross-sectional views of different patterns of a stacked structure according to an embodiment of the present invention. Referring to FIG. 2A, the color filter patterns 234 are, for example, composed of a red color filter pattern 234R, a green color filter pattern 234G and a blue color filter pattern 234B, and in the present embodiment, the stacked structure 250A is composed of the green color filter pattern 234G and the red color filter pattern 234R. Referring to FIG. 2B, in the present embodiment, the stacked structure 250B is composed of the green color filter pattern 234G and the blue color filter pattern 234B. Referring to FIG. 2C, in the present embodiment, the stacked structure 250C is composed of the blue color filter pattern 234B and the red color filter pattern 234R. Table 1 shows measured values of the optical density of the light-shielding patterned layer 232 using different patterns of the stacked structures 250A, 250B and 250C, wherein thickness of the tested light-shielding patterned layer 232 and the color filter pattern 234 are respectively 1 μm.

TABLE 1

| Optical density | Light-shielding patterned layer 232 | Light-shielding patterned layer 232 + stacked structure 250A | Light-shielding patterned layer 232 | Light-shielding patterned layer 232 + stacked structure 250B | Light-shielding patterned layer 232 | Light-shielding patterned layer 232 + stacked structure 250C |
|---|---|---|---|---|---|---|
| 1 | 1.843 | 2.627 | 1.864 | 2.490 | 1.824 | 3.032 |
| 2 | 1.820 | 2.620 | 1.855 | 2.491 | 1.811 | 3.020 |
| 3 | 1.806 | 2.621 | 1.854 | 2.500 | 1.839 | 3.006 |

TABLE 1-continued

| Optical density | Light-shielding patterned layer 232 | Light-shielding patterned layer 232 + stacked structure 250A | Light-shielding patterned layer 232 | Light-shielding patterned layer 232 + stacked structure 250B | Light-shielding patterned layer 232 | Light-shielding patterned layer 232 + stacked structure 250C |
|---|---|---|---|---|---|---|
| 4 | 1.819 | 2.633 | 1.859 | 2.475 | 1.813 | 2.994 |
| 5 | 1.823 | 2.623 | 1.862 | 2.475 | 1.863 | 3.030 |
| Average | 1.822 | 2.625 | 1.859 | 2.486 | 1.830 | 3.016 |

As shown in the table 1, by suitably selecting the optical density of the light-shielding patterned layer 232, the alignment accuracy during the fabrication process can be increased, and the problems such as decrease of the aperture ratio, etc. cause by the alignment shift can be avoided, so as to achieve a high process margin. On the other hand, by extending the color filter patterns 234 of different colors from the pixel regions 212 to the light-shielding region 214 to constitute the stacked structure 250, the optical density of the light-shielding region 214 can be greatly increased. In other words, the stacked structure 250 of the present invention avails improving the light-shielding effect of the light-shielding region 214, so that a high contrast product can be obtained. As shown in the table 1, in the present embodiment, the stacked structures 250A, 250B and 250C can all effectively improve the light-shielding effect. In particular, the stacked structure 250C composed of the blue color filter pattern 234B and the red color filter pattern 234R can provide a better light-shielding effect.

Figure 3:
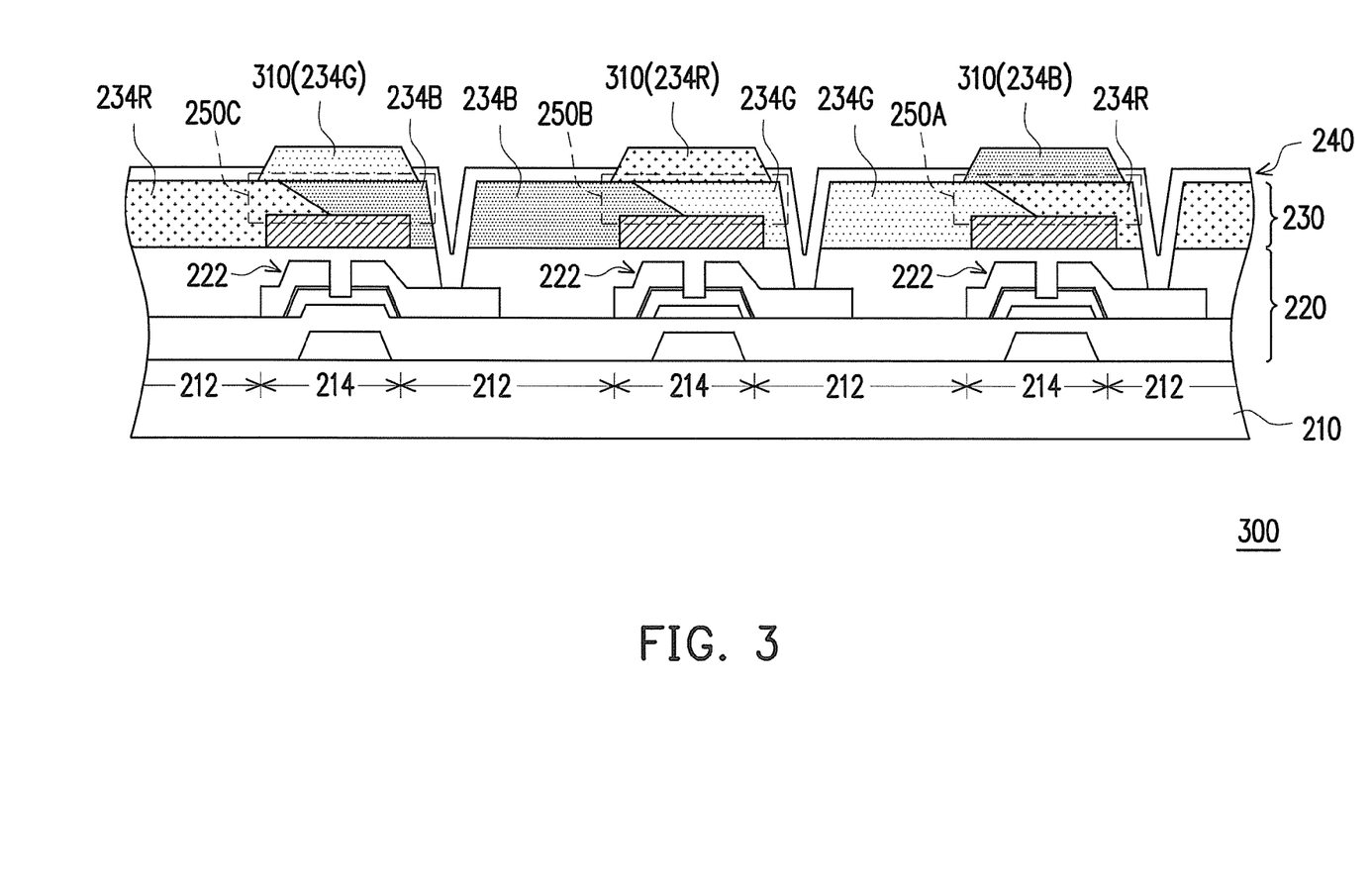
FIG. 3 is a partial cross-sectional view of a color filter array on pixel array substrate according to an embodiment of the present invention.

FIG. 3 is a partial cross-sectional view of a color filter array on pixel array substrate according to an embodiment of the present invention. Referring to FIG. 3, the color filter array on pixel array substrate 300 of the present embodiment is similar to the color filter array on pixel array substrate 200 of the aforementioned embodiment, though the color filter array on pixel array substrate 300 further includes another color filter pattern 310 stacked on the stacked structure 250 of the light-shielding region 214. In other words, a material of the color filter pattern 310 stacked on the stacked structure 250 is different to a material of the color filter patterns forming the stacked structure 250. For example, the blue color filter pattern 234B is stacked on the stacked structure 250A composed of the green color filter pattern 234G and the red color filter pattern 234R, the red color filter pattern 234R is staked on the stacked structure 250B composed of the green color filter pattern 234G and the blue color filter pattern 234B, or the green color filter pattern 234G is staked on the stacked structure 250C composed of the blue color filter pattern 234B and the red color filter pattern 234R. Since light-filtering wavelengths of different color filter patterns 234 are different, not only the light-shielding effect of the light-shielding region 214 can be greatly improved according to the stacked structure, but also the aforementioned fabrication process is the same to an existing fabrication process, wherein the original mask(s) is partially modified, and adding of additional mask process is unnecessary.

Figure 7A:
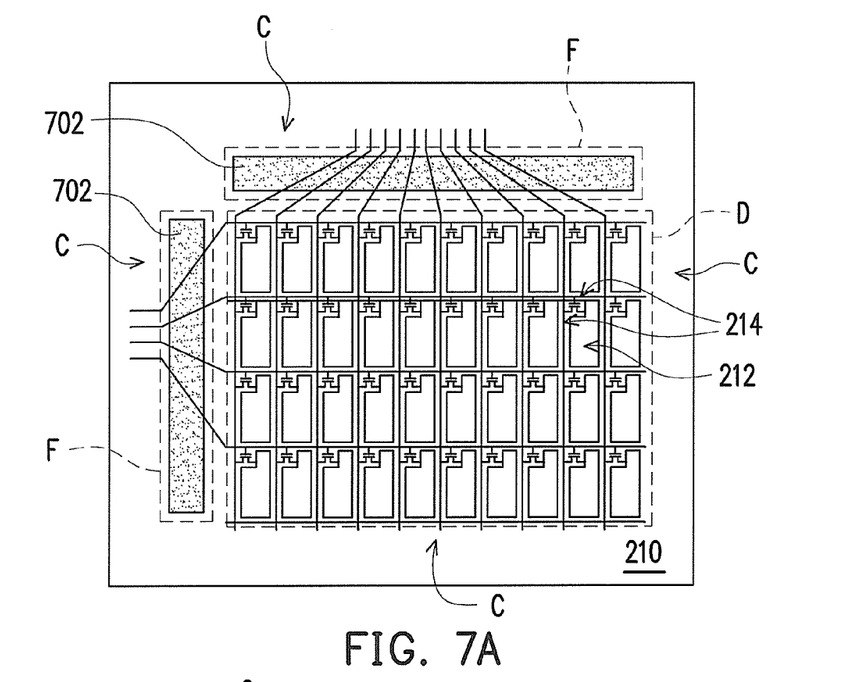
FIG. 7A is a top view of a color filter array on pixel array substrate according to an embodiment of the present invention.
Figure 7B:
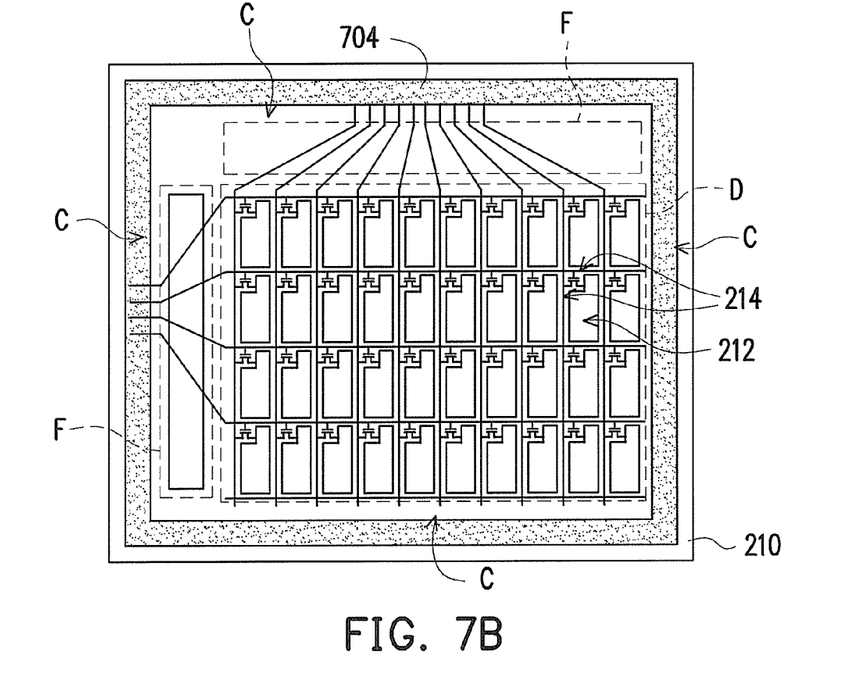
FIG. 7B is a top view of a color filter array on pixel array substrate according to another embodiment of the present invention.

Certainly, relative positions among the stacked structure, the light-shielding pattern, the active array substrate and the pixel electrode layer are not limited by the present invention, and a position and a size of the stacked structure are also not limited. For example, as shown in FIG. 7A, the substrate 210 has a display region D, a peripheral circuit region C and a fanout region F. The peripheral circuit region C approximately surrounds the display region D. The display region D has a plurality of pixel regions 212 and a light-shielding region 214 around each pixel region 212. In the light-shielding region 214, scan lines, data lines and active devices are disposed therein. In each of the pixel regions 212, a pixel electrode is disposed therein. The peripheral circuit region C is located adjacent to a side of the substrate 210, and the fanout region F is connected to the peripheral circuit region C. The color filter patterns 234 further constitute another stacked structure 702 in the fanout region F. According to another embodiment, the color filter patterns 234 further constitute another stacked structure 704 in the peripheral circuit region C (as shown in FIG. 7B). Several implementing patterns of the color filter array on pixel array substrate are provided below, though these implementing patterns are not used for limiting the present invention.

Figure 4:
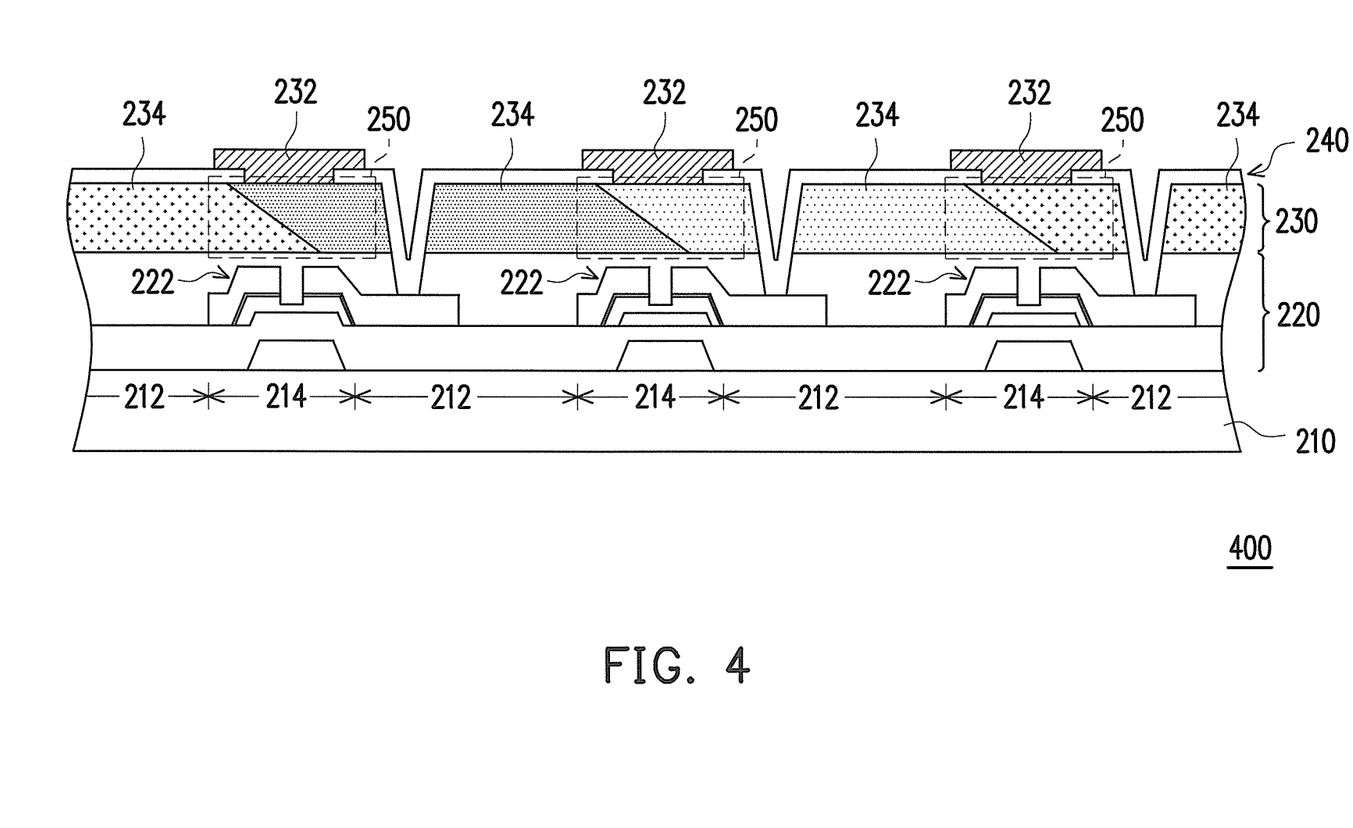
FIG. 4 is a partial cross-sectional view of a color filter array on pixel array substrate according to an embodiment of the present invention.

FIG. 4 is a partial cross-sectional view of a color filter array on pixel array substrate according to an embodiment of the present invention. Referring to FIG. 4, in the color filter array on pixel array substrate 400 of the present embodiment, the light-shielding patterned layer 232 is disposed on the pixel electrode layer 240. In other words, in the present embodiment, the stacked structure 250 formed by the color filter patterns 234 is located between the light-shielding patterned layer 232 and the active device array 220. By such means, the effect of increasing the alignment accuracy during the fabrication process to increase the contrast of the product is also achieved. Other elements are similar as that described in the aforementioned embodiment, and therefore detailed descriptions thereof are not repeated.

Figure 5:
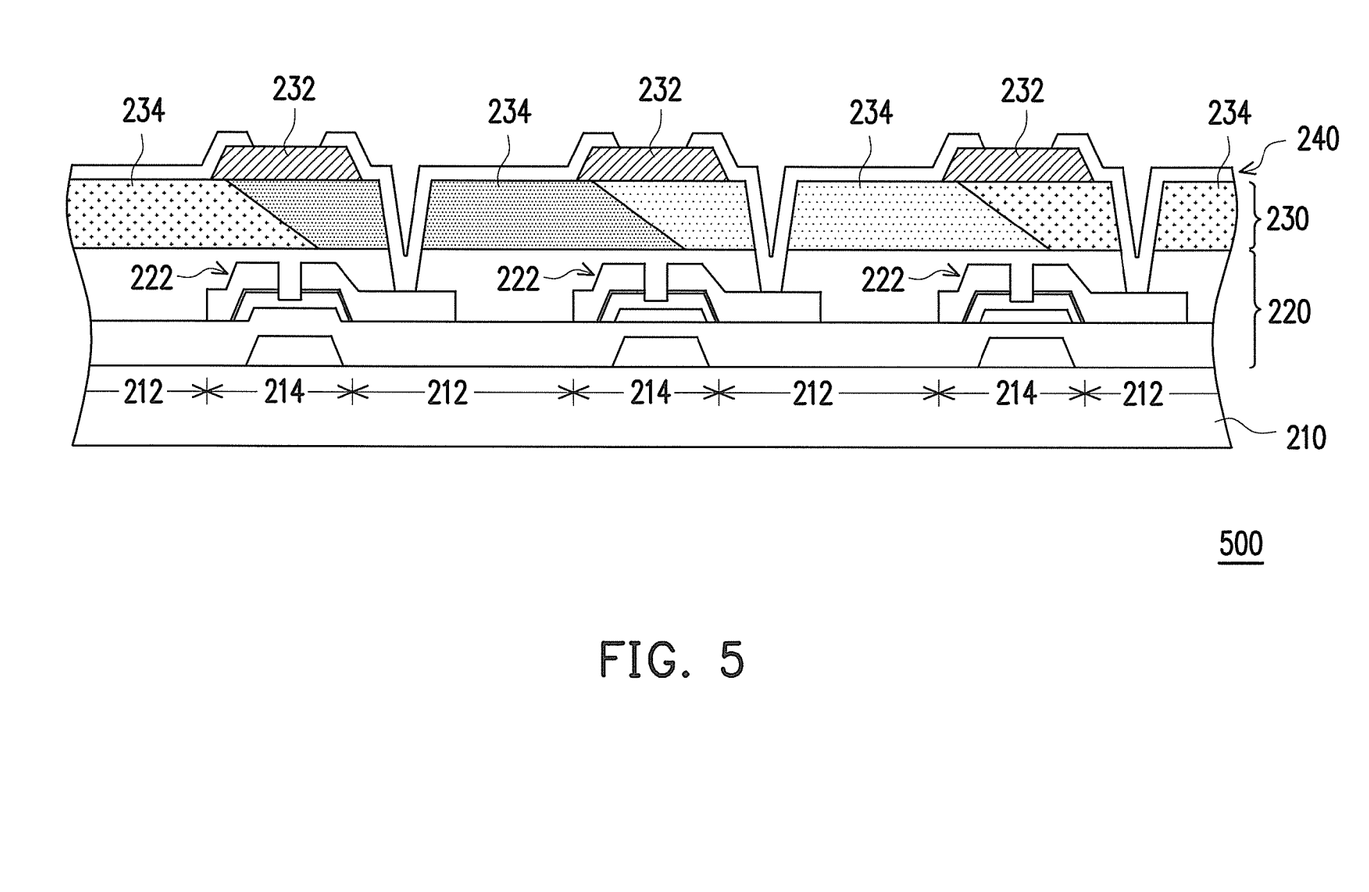
FIG. 5 is a partial cross-sectional view of a color filter array on pixel array substrate according to an embodiment of the present invention.

FIG. 5 is a partial cross-sectional view of a color filter array on pixel array substrate according to an embodiment of the present invention. Referring to FIG. 5, in the color filter array on pixel array substrate 500 of the present embodiment, the light-shielding patterned layer 232 is located between the pixel electrode layer 240 and the color filter array 230. By such means, the effect of increasing the alignment accuracy during the fabrication process to increase the contrast of the product is also achieved. Other elements are similar as that described in the aforementioned embodiment, and therefore detailed descriptions thereof are not repeated.

Figure 6:
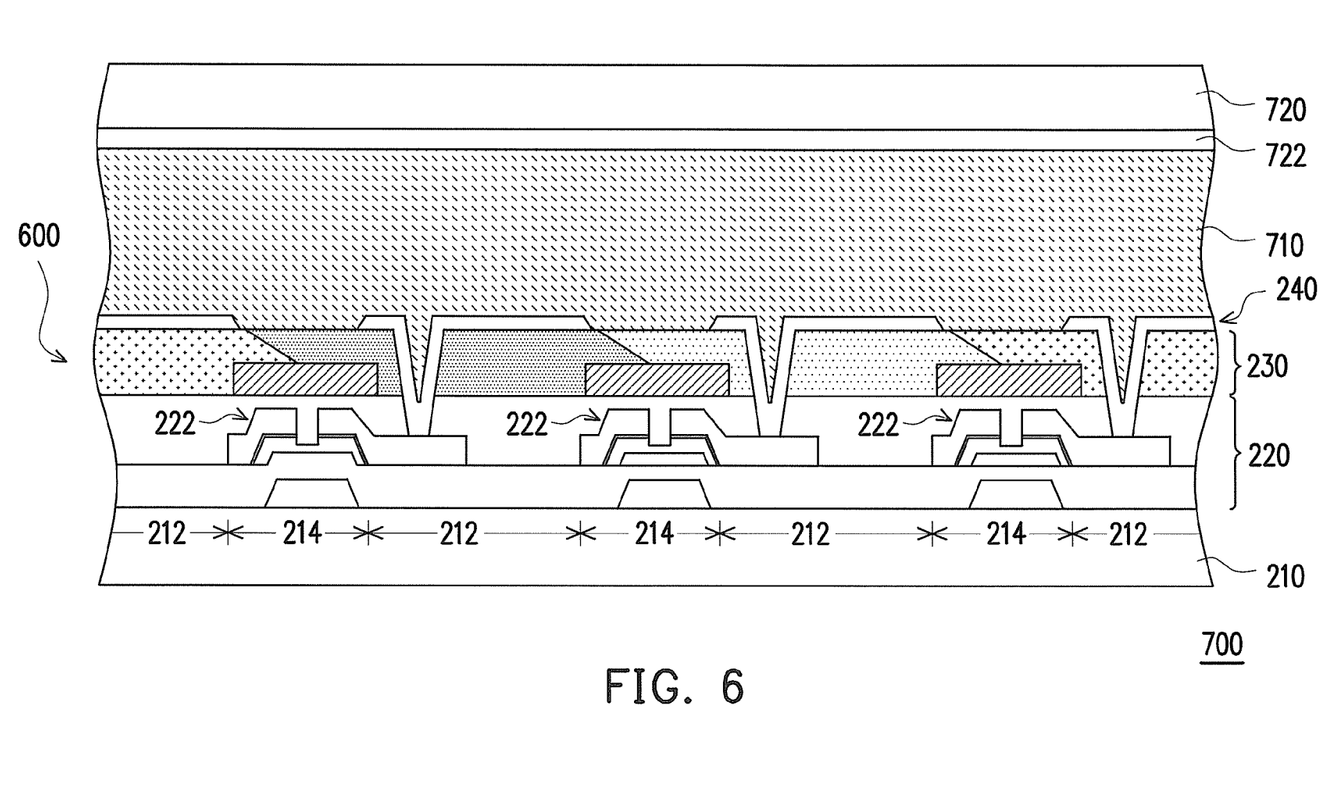
FIG. 6 is a partial cross-sectional view of a display panel according to an embodiment of the present invention.

FIG. 6 is a partial cross-sectional view of a display panel according to an embodiment of the present invention. In an actual application, the display panel 700 includes a color filter array on pixel array substrate 600, an opposite substrate 720 and a display medium 710, wherein the color filter array on pixel array substrate 600 can be any aforementioned implementing pattern of the color filter array on pixel array substrate, i.e. any of the aforementioned color filter array on pixel array substrates 200, 300, 400 and 500, wherein like reference numerals refer to the like elements, and detailed descriptions thereof are not repeated. Moreover, the opposite substrate 720 is located opposite to the color filter array on pixel array substrate 600. In the present embodiment, the opposite substrate 720 has a common electrode 722 facing to the color filter array on pixel array substrate 600. The display medium 710 is located between the color filter array on pixel array substrate 600 and the opposite substrate 720, wherein the display medium 710 presents different display effects according to voltage differences between the common electrode 722 and the pixel electrode layer 240.

As described above, in the present embodiment, by setting the stacked structure 250 in the light-shielding region 214 of the color filter array on pixel array substrate 600, while the alignment accuracy is improved during the fabrication process, the light-shielding effect of the light-shielding patterned layer is also strengthened, so as to increase the contrast of the display panel 700.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A color filter array on pixel array substrate, comprising:
    a substrate, having a display region comprising a plurality of pixel regions and a light-shielding region therein, a peripheral circuit region and a fanout region, wherein the peripheral circuit region approximately surrounds the display region and is located adjacent to a side of the substrate, and the fanout region is connected to the peripheral circuit region;
    an active device array, disposed on the substrate;
    a plurality of signal lines, electrically connected to the active device array and disposed in the fanout region;
    a color filter array, disposed on the substrate, and comprising:
        a plurality of color filter patterns, respectively disposed in the pixel regions and extend from the pixel regions to the light-shielding region, wherein the color filter patterns extending from adjacent pixel regions constitute a stacked structure within the light-shielding region, and the color filter patterns further constitute another stacked structure in the peripheral circuit region or the fanout region, wherein said another stacked structure completely covers the fanout region so as to cover the signal lines;
        a light-shielding patterned layer, located between the active device array and the color filter patterns, and is disposed in the light-shielding region; and
    a pixel electrode layer, electrically connected to the active device array, wherein the pixel electrode layer comprises a plurality of pixel electrodes, and each of the pixel electrodes is formed in the vicinity of the stacked structure.

2. The color filter array on pixel array substrate as claimed in claim 1, further comprising another color filter pattern stacked on the stacked structure in the light-shielding region.

3. The color filter array on pixel array substrate as claimed in claim 1, wherein an optical density of the light-shielding patterned layer is between 0.6-3.4.

4. The color filter array on pixel array substrate as claimed in claim 3, wherein an optical density of the stacked structure is between 0.6-1.2.

5. The color filter array on pixel array substrate as claimed in claim 4, wherein an optical density of an overlapped region of light-shielding patterned layer and the stacked structure is between 1.8-4.0.

6. The color filter array on pixel array substrate as claimed in claim 1, wherein the color filter patterns comprise a red color filter pattern, a green color filter pattern and a blue color filter pattern.

7. The color filter array on pixel array substrate as claimed in claim 1, wherein the substrate further has a peripheral circuit region and a fanout region, the peripheral circuit region approximately surrounds the pixel region and the light-shielding region and is located adjacent to a side of the substrate, and the fanout region is connected to the peripheral circuit region, wherein the color filter patterns further constitute another stacked structure in the peripheral circuit region or the fanout region.

* * * * *